United States Patent
Storm et al.

(10) Patent No.: US 12,283,130 B2
(45) Date of Patent: Apr. 22, 2025

(54) SPOOF DETECTION BY GENERATING 3D POINT CLOUDS FROM CAPTURED IMAGE FRAMES

(71) Applicant: Jumio Corporation, Palo Alto, CA (US)

(72) Inventors: Gregory Lee Storm, Parkville, MO (US); Reza R. Derakhshani, Shawnee, KS (US)

(73) Assignee: Jumio Corporation, Sunnyvale, CA (US)

( * ) Notice: Subject to any disclaimer, the term of this patent is extended or adjusted under 35 U.S.C. 154(b) by 707 days.

(21) Appl. No.: 16/520,839

(22) Filed: Jul. 24, 2019

(65) Prior Publication Data

US 2021/0027080 A1   Jan. 28, 2021

(51) Int. Cl.
*G06F 21/00*   (2013.01)
*G06F 21/32*   (2013.01)
(Continued)

(52) U.S. Cl.
CPC .............. *G06V 40/45* (2022.01); *G06F 21/32* (2013.01); *G06F 21/35* (2013.01); *G06T 7/586* (2017.01); *G06T 7/593* (2017.01); *G06T 2207/10016* (2013.01); *G06T 2207/10028* (2013.01); *G06V 40/16* (2022.01); *G06V 40/19* (2022.01)

(58) Field of Classification Search
CPC ......... G06F 21/32; G06F 21/35; G06V 40/16; G06V 40/19; G06V 40/45; G06T 7/586; G06T 7/593; G06T 2207/10016; G06T 2207/10028; H04L 63/0861
See application file for complete search history.

(56) References Cited

U.S. PATENT DOCUMENTS

| 8,457,367 | B1 | 6/2013 | Sipe et al. |
| 9,058,519 | B2 | 6/2015 | Law et al. |

(Continued)

FOREIGN PATENT DOCUMENTS

CN    104915649 B  *  6/2015  ........... G06V 40/161

OTHER PUBLICATIONS

Wikipedia [online], "Fundamental matrix (computer vision)," Jul. 2019, retrieved on Dec. 19, 2019, retrieved from URL<https://en.wikipedia.org/wiki/Fundamental_matrix_(computer_vision)>, 5 pages.

*Primary Examiner* — Joseph P Hirl
*Assistant Examiner* — Chi D Nguy
(74) *Attorney, Agent, or Firm* — Patent Law Works LLP

(57) ABSTRACT

A method includes receiving a first sequence of images of a first subject captured over a time period in which relative locations of the image acquisition device with respect to the first subject varies. A first image and a second image are selected as representing a first and second relative locations, respectively, of the image acquisition device with respect to the first subject. A first set of points and a second set of points are generated in a three-dimensional space, using the first image and the second image as a stereo pair, the first and second sets of points representing the first subject, and a background, respectively. It is determined that a difference between a first depth associated with the first set of points, and a second depth associated with the second set of points satisfies a threshold condition, and in response, access to a secure system is prevented.

20 Claims, 9 Drawing Sheets

(51) Int. Cl.
  *G06F 21/35*   (2013.01)
  *G06T 7/586*   (2017.01)
  *G06T 7/593*   (2017.01)
  *G06V 40/40*   (2022.01)
  G06V 40/16    (2022.01)
  G06V 40/19    (2022.01)

(56) References Cited

U.S. PATENT DOCUMENTS

| | | |
|---|---|---|
| 9,117,109 B2 | 8/2015 | Nechyba et al. |
| 9,607,138 B1 * | 3/2017 | Baldwin ............... H04W 12/06 |
| 9,928,603 B2 | 3/2018 | Martin |
| 10,346,990 B2 | 7/2019 | Martin |
| 10,515,199 B2 | 12/2019 | Samadani et al. |
| 10,659,405 B1 | 5/2020 | Chang et al. |
| 10,698,995 B2 | 6/2020 | Tussy |
| 2011/0050853 A1 | 3/2011 | Zhang et al. |
| 2013/0188840 A1 * | 7/2013 | Ma ........................ G06V 40/45 |
| | | 382/107 |
| 2013/0212655 A1 | 8/2013 | Hoyos et al. |
| 2014/0016837 A1 | 1/2014 | Nechyba et al. |
| 2014/0307929 A1 | 10/2014 | Neechyba et al. |
| 2015/0347833 A1 * | 12/2015 | Robinson ............... G01B 11/25 |
| | | 348/49 |
| 2016/0057138 A1 * | 2/2016 | Hoyos .................. G06V 40/168 |
| | | 726/7 |
| 2016/0188958 A1 | 6/2016 | Martin |
| 2017/0042439 A1 | 2/2017 | Yeow et al. |
| 2017/0316419 A1 * | 11/2017 | Laporta .............. G06Q 20/3276 |
| 2018/0063484 A1 | 3/2018 | Smits |
| 2018/0096576 A1 * | 4/2018 | Anderholm ........... G01S 13/886 |

\* cited by examiner

SPOOF DETECTION BY GENERATING 3D POINT CLOUDS FROM CAPTURED IMAGE FRAMES

TECHNICAL FIELD

This disclosure relates to image capture devices used in biometric authentication.

BACKGROUND

Systems incorporating a biometric identification technology such as face recognition or iris recognition often include a camera that captures an image of a user. The captured image is then processed to authenticate the user using the biometric identification technology.

SUMMARY

In one aspect, this document features a method that includes receiving, at one or more processing devices, a first sequence of images of a first subject captured by an image acquisition device over a time period in which relative locations of the image acquisition device with respect to the first subject varies. The method also includes selecting, by the one or more processing devices, a first image and a second image from the first sequence of images, wherein the first image represents a first relative location of the image acquisition device with respect to the first subject, and the second image represents a second relative location, different from the first relative location, of the image acquisition device with respect to the first subject. The method further includes generating, by the one or more processing devices and using the first image and the second image as a stereo pair, (i) a first set of points in a three-dimensional space, the first set of points representing the first subject, and (ii) a second set of points in the three dimensional space, the second set of points representing a background depicted in the first and second images. The method also includes determining that a first difference between (i) a first depth associated with the first set of points, and (ii) a second depth associated with the second set of points satisfies a threshold condition, and responsive to determining that the first difference satisfies a threshold condition, preventing access to a secure system.

In another aspect, this document features a system that includes an image acquisition device and an image analysis engine that includes one or more processing devices. The image acquisition device captures a first sequence of images of a first subject over a time period in which relative locations of the image acquisition device with respect to the first subject varies. The image analysis engine receives the first sequence of images, and selects a first image and a second image from the first sequence of images. The first image represents a first relative location of the image acquisition device with respect to the first subject, and the second image represents a second relative location, different from the first relative location, of the image acquisition device with respect to the first subject. The image analysis engine also generates, using the first image and the second image as a stereo pair, (i) a first set of points in a three-dimensional space, the first set of points representing the first subject, and (ii) a second set of points in the three dimensional space, the second set of points representing a background depicted in the first and second images. The image analysis engine further determines that a first difference between (i) a first depth associated with the first set of points, and (ii) a second depth associated with the second set of points satisfies a threshold condition, and in response, prevents access to a secure system.

In another aspect, this document features one or more non-transitory machine-readable storage devices having encoded thereon computer readable instructions for causing one or more processing devices to perform various operations. The operations include receiving a first sequence of images of a first subject captured by an image acquisition device over a time period in which relative locations of the image acquisition device with respect to the first subject varies. The operations also include selecting a first image and a second image from the first sequence of images, wherein the first image represents a first relative location of the image acquisition device with respect to the first subject, and the second image represents a second relative location, different from the first relative location, of the image acquisition device with respect to the first subject. The operations further include generating, by the one or more processing devices and using the first image and the second image as a stereo pair, (i) a first set of points in a three-dimensional space, the first set of points representing the first subject, and (ii) a second set of points in the three dimensional space, the second set of points representing a background depicted in the first and second images. The operations further include determining that a first difference between (i) a first depth associated with the first set of points, and (ii) a second depth associated with the second set of points satisfies a threshold condition, and responsive to determining that the first difference satisfies a threshold condition, preventing access to a secure system.

Implementations of any of the above aspects can include one or more of the following features.

The first subject can be identified as an alternative representation of a live person responsive to determining that the first difference satisfies a threshold condition, and in response, the access to the secure system can be prevented. The image acquisition device can be a camera disposed on a mobile device, and the sequence of images can be captured as the mobile device is moved towards the first subject. The alternative representation of the live person can include a photograph of the live person printed on paper, or presented on a display device. At least one of the first and second set of points can be generated using a photometric stereo process for estimating a three dimensional shape from two dimensional images. The photometric stereo process can includes a structure-from-motion process, and/or a shape-from-shading process. A second sequence of images of a second subject captured by the image acquisition device over a time period can be received at the one or more processing devices, wherein relative locations of the image acquisition device with respect to the second subject can vary. A third image and a fourth image can be selected from the second sequence of images, wherein the third image represents a first relative location of the image acquisition device with respect to the second subject, and the fourth image represents a second relative location, different from the first relative location, of the image acquisition device with respect to the second subject. The one or more processing devices can generate, using the third image and the fourth image as another stereo pair, (i) a third set of points in the three-dimensional space, the third set of points representing the second subject, and (ii) a fourth set of points in the three dimensional space, the fourth set of points representing a background depicted in the third and fourth images. A determination may be made that a second difference between (i) a third depth associated with the third set of points, and (ii) a fourth depth associated with the fourth set of points fails to satisfy the threshold condition, and in response, an authentication process can be initiated for determining if the second subject is authorized to access the secure system.

Various implementations described herein may provide one or more of the following advantages. By capturing a sequence of images during periods of relative movements between a subject and an image capture device, images from multiple viewpoints can be captured using a single camera. Two or more images (e.g., a stereo pair) from the sequence can therefore be used in generating a three dimensional (3D) point cloud representing portions of the subject as well as the background using, for example, photometric stereo processes. Such 3D point clouds can then be used in detecting if the subject and the background are within a threshold distance of one another, and that information in turn can be used to determine whether the subject in the image is a live human, or a spoof alternative representation (e.g., a photograph of a human printed on paper, or presented on a high-resolution display device). The technology described herein can therefore facilitate implementation of spoof detection based on 3D techniques, but without using more than one camera as is otherwise needed in capturing stereo pairs of images. In addition, because the decision criterion is a depth difference between the subject and the background, a decision may be reached without generating a full 3D representation of the subject and the background. This in turn can allow for a spoof detection system to be implemented on resource-constrained environments such as mobile devices, and/or reduce hardware complexities associated with other devices using image-based biometric authentication. By allowing for a quick discrimination between an image of a live person and an image of a spoof alternative representation, additional processing can be preemptively terminated, thereby creating an additional layer of security.

Figure 1C:
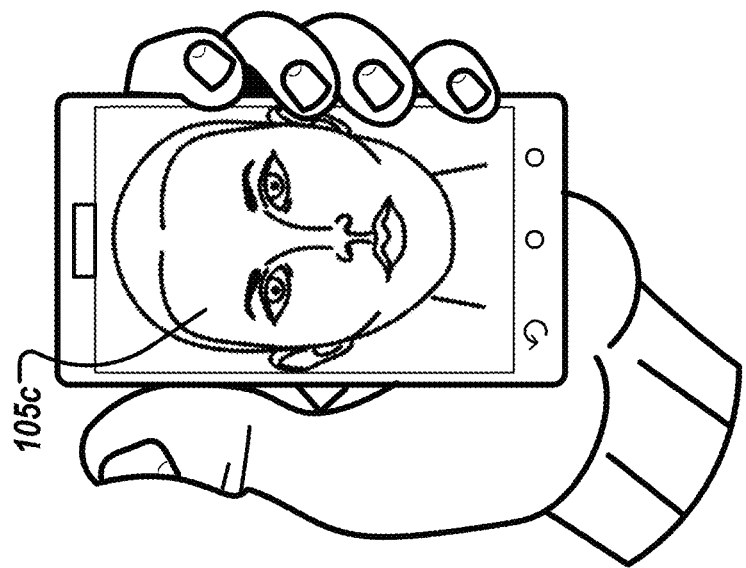
FIGS. 1A-1C show a mobile device capturing images of a subject from different relative locations of the subject and the mobile device, as an example environment in which the technology described herein may be used.

Repeat use of reference characters in the present specification and drawings is intended to represent same or analogous features or elements.

DETAILED DESCRIPTION

This document presents an image analysis method in which multiple images captured using an image acquisition device is analyzed to determine if the subject in the images is an actual live person, or an alternative representation (e.g., a photograph or another image of the live person printed on paper, or displayed on a high definition display device) of the live person. Specifically, the technology described herein includes capturing multiple images of a subject using a single image acquisition device (e.g., a camera of a mobile device) from various relative positions of the image acquisition device and the subject, and then generating a 3D point cloud based on corresponding points of the subject and the background identified in at least two of the multiple images (e.g., using the two images as a stereo pair). In one example implementation, when a mobile device is used to capture a facial image (e.g., for a face/iris/eyeprint image based biometric authentication process), the mobile device is gradually brought in alignment with the subject. The camera of the mobile device can be triggered to capture a sequence of additional images (e.g., as a series of video frames) over the time period in which the camera is brought in alignment with the subject to capture a final image. The additional images in such a sequence are likely to include at least two images in which the face is captured from two different locations. Corresponding subject and background points can then be identified in the pair of images, and a 3D point cloud of the subject's face and the background can then be generated from such an image pair using a photometric stereo process. The 3D point cloud can in turn be used in determining whether the subject is a live person, or a spoof alternative representation of the live person. For example, if the subject is a photograph or another image of the live person printed on paper, or displayed on a high definition display device, any 3D representation generated from images of such a subject would show that a first set of points corresponding to the subject and a second set of points corresponding to the background are at substantially the same depth in the 3D point cloud. The difference in depth between the subject and the background can be tested against a threshold condition, and accordingly, an inference can be made that the subject in the captured images is not a live person. As such, the technology described herein allows for liveness detection using an image capture device (e.g., a camera, and optionally a flash, of a mobile device) but without using additional secondary devices (e.g., an additional camera or special-purpose illuminators)

If the captured images are not determined to correspond to a live person, any further processing of the captured images by the biometric authentication system can be stopped, and any corresponding access attempt can be prevented immediately. Many biometric authentication systems involve authenticating a user to a secure system based on recognizing the user's face, eye-print, iris etc. Such biometric authentication systems involve capturing one or more images of a user, and executing corresponding recognition processes on the captured image. Malicious attempts to breach the security of such biometric authentication systems can include presenting an alternative representation of a live person to gain access to an account or other privileges associated with the identity of the corresponding live person. Such attacks are generally known as spoof attacks, and the reliability/security of a biometric authentication system can be determined by the ability of the system to differentiate between a live person and corresponding alternative representations (also referred to as spoofs). The technology described herein improves security/reliability of biometric authentication systems that rely on recognizing a user based on face recognition, eye-print recognition, iris recognition etc. Specifically, this document describes pre-processing steps that allow for determining whether the captured image corresponds to an actual live person or a spoof alternative representation such as a printed or displayed image/photograph of the live person. Based on detecting that the captured image is a spoof, any further processing of the image to allow access to a corresponding secure system can be prevented, thereby adding an added layer of security to the system. The technology can be used in mobile devices, as well as in larger devices (e.g., kiosk devices) where a subject (and not the device) moves to achieve alignment between the subject and a corresponding camera of the device. Examples of these environments are described next.

Figure 1B:
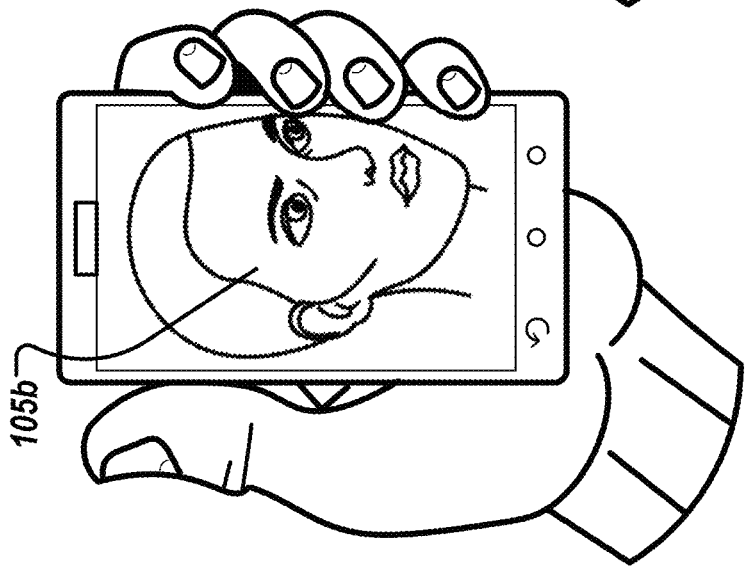
Figure 1A:
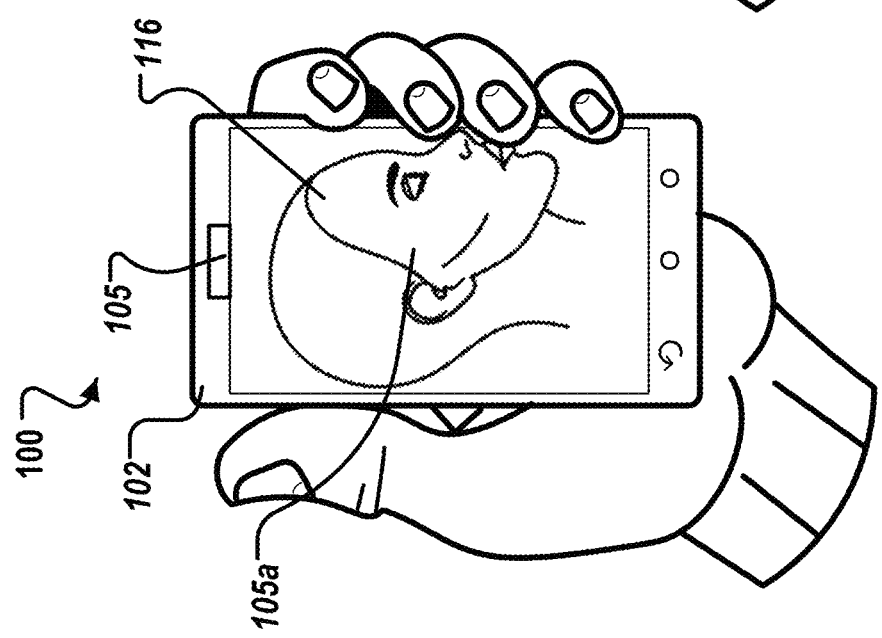

FIGS. 1A-1C show a mobile device 102 capturing images of a subject from different relative locations of the subject and the mobile device, as an example environment 100 in which the technology described herein may be used. For example, the mobile device 102 can be used to authenticate a user to one or more services (e.g., a payment processing service) made available to the user via an application executing on the mobile device. The application executing on the mobile device 102 can require the user to be authenticated via a biometric authentication process before allowing access to a secure system associated with the services. In some implementations, a face/iris/eyeprint based biometric authentication process may be used, which in turn may require capture of a facial image of the user.

In the example of FIGS. 1A-1C, the mobile device 102 is used to capture a facial image of a subject, using the camera 104 of the mobile device 102. In an example use-case scenario, the mobile device 102 is gradually lifted towards a face of the subject to capture a final image 105c (in FIG. 1C) that may be usable in a biometric authentication process. However, because the mobile device would likely be aligned to the face gradually over a short time period, a sequence of additional images 105a (FIG. 1A) and 105b (FIG. 1B) may be captured during that time period. Because the relative locations of the mobile device and the subject varies over that time period, the images 105a, 105b, and 105c (105, in general) represent images of the subject as captured from multiple locations of the mobile device 102 with respect to the subject.

In some implementations, the relative separation of the locations corresponding to a pair of images (e.g., the image 105a and 105b) can be determined based on sensor outputs from one or more sensors disposed in the mobile device. For example, the relative separation/orientation of capture-locations corresponding to two images can be determined based on an output of one or more of: an accelerometer, a gyroscope, a magnetometer, or another MEMS sensor disposed in the mobile device 102. Optical sensors (e.g., one or more cameras and optical flow sensors), or other sensors that allow for measuring/characterizing movements of the mobile device 102 may also be used. For example, it may be possible to use a wireless module (e.g., a Bluetooth® module or a Wi-Fi module) of the mobile device 102 to detect how the movement of the mobile device in a corresponding wireless network affects (or perturbs) one or more network parameters. Such information may in turn be used to determine location of the mobile device in an environment, and hence used for the purposes described herein.

In some implementations, a photometric stereo process is applied to the first and second images. For example, an assumption can be made that the first image is the "reference" (e.g. because the subject's actual orientation with respect to the camera is not known in general). The movement evident between the first and second images can then be calculated, for example, by 1) finding match points in each image, 2) comparing relative locations of each of those points in each image, 3) determining, using the estimated distance to the subject and one or more camera parameters (i.e. the calibration information on focal characteristics, etc.), how much "motion" the camera sees in the image, and 4) determining the fundamental matrix that describes the difference in orientation of the camera between images (as sensed by the camera). In computer vision, the fundamental matrix F is a 3×3 matrix which relates corresponding points in stereo images. In epipolar geometry terms, if x and x' denote corresponding points in a stereo image pair, and Fx describes the line (often referred to as an epipolar line) connecting x and x', All pairs of corresponding points satisfies the relationship:

$$x'^T Fx = 0$$

In some implementations, the match points are labeled as being either a part of the subject or a part of the background, and a 3D point cloud is then generated by determining a location of the match points in a 3D space. A first set of points can be identified as being a part of the subject, and a second set of points can be identified as being part of the background. This can be done in various ways, for example, using skin tone detection—where a pixel value falling in the expected range of skin tone values is classified as being a part of the subject, and a pixel value falling outside the expected range of skin tone values is classified as being a part of the background. Based on the relative displacements of these points in the two images, and the known difference in the corresponding locations of the camera, a distance of the points from the camera can be calculated, and their locations in a 3D space can be determined. The 3D point cloud generated this way can then be used to determine whether the subjects in the underlying image pair is a live human being or a spoof alternative representation thereof. For example, a representative depth for each of the first set of points and the second set of points can first be determined (e.g., using an average depth of the points), and a difference between the two can be calculated. If the difference satisfies threshold condition, e.g., is less than a threshold distance, the subject in the images and the background can be determined to be substantially on the same plane, and hence the underlying images can be identified as being of a spoof alternative representation rather than a human being. On the other hand, if the difference fails to satisfy a threshold condition, e.g., is more than a threshold distance, the subject in the images and the background can be determined to be at different depths, and the underlying images can be identified as being of a human being. Based on whether or not the subject is identified as a spoof alternative representation or a human being, access to a secure system can be preempted or allowed, respectively. In some implementations, a machine learning engine (e.g., a logistic model, naïve Bayesian classifier, a support vector machine (SVM), a deep neural network (DNN) etc.) can be used to discriminate between live human subjects and spoof alternative representations as described herein.

Figure 2A:
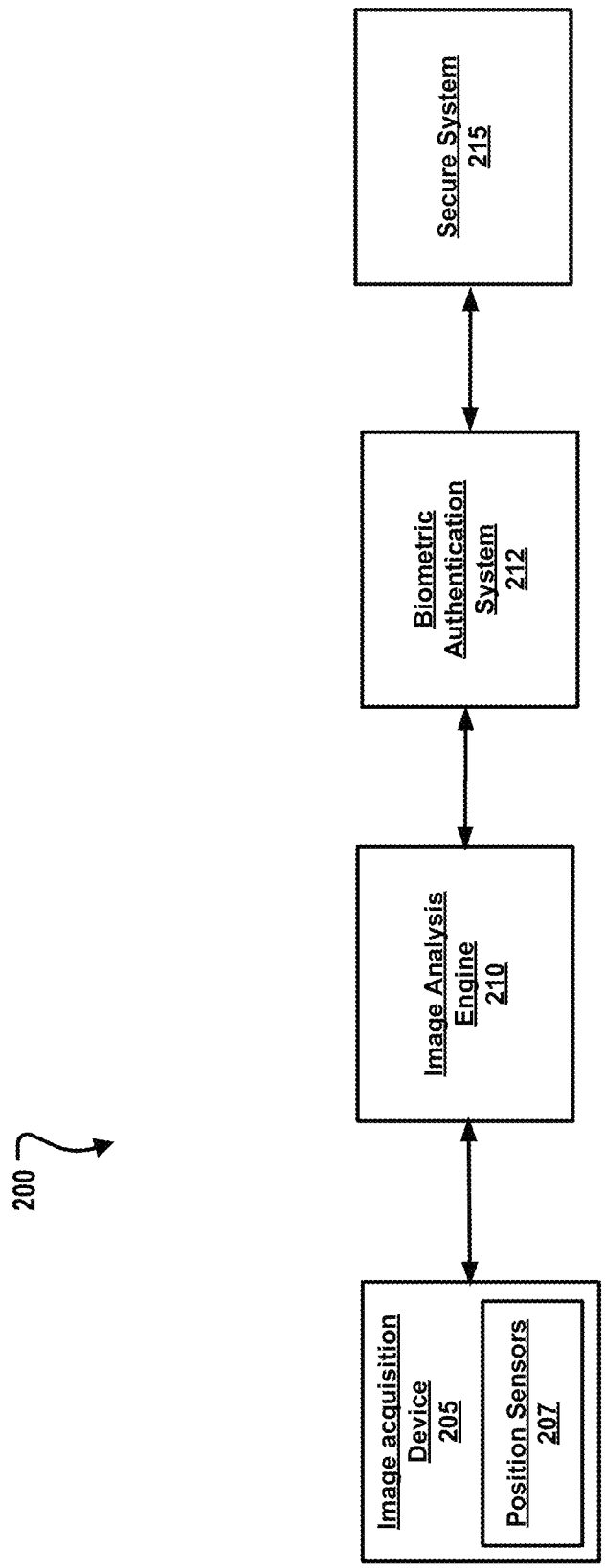
FIG. 2A is an example system that can be used for implementing technology described herein.

FIG. 2A is an example system that can be used for implementing technology described herein. The system 200 includes an image acquisition device 205, and image analysis engine 210, and a secure system 215 an access to which is controlled via a biometric authentication system. The image acquisition device 205 can be substantially similar to the camera 104 of the mobile device 102 (FIG. 1A). In some implementations, the image acquisition device can include a video camera that captures a sequence of images of a subject within a time period. In some implementations, the image acquisition device 205 can include one or more position sensors 207 that can be used to estimate a location of the image acquisition device for the purposes described herein. For example, the one or more position sensors 207 can include, for example, an accelerometer, a gyroscope, a magnetometer, and/or other MEMS sensors. In some implementations, the one or more position sensors 207 can include an optical flow sensor or other sensors that can be used for determining a location of the image acquisition device 205.

The system 200 also includes an image analysis engine 210 that can be configured to implement one or more processes in accordance with technology herein. For example, the image analysis engine 210 can select multiple images from a sequence of images captured by the image acquisition device 205, and generate a 3D point cloud using the selected images in accordance with technology described above. In some implementations, the image analysis engine 210 can be located at a remote location with respect to the image acquisition device 205. For example, the image analysis engine 210 can be implemented on a server that is remotely located with respect to a mobile device on which the image acquisition device 205 is disposed. In such cases, the image acquisition device 205 can be in communication with the image analysis engine 210 over one or more networks. In some implementations, at least a portion of the image analysis engine 210 can be located on the same device with the image acquisition device 205.

Figure 2B:
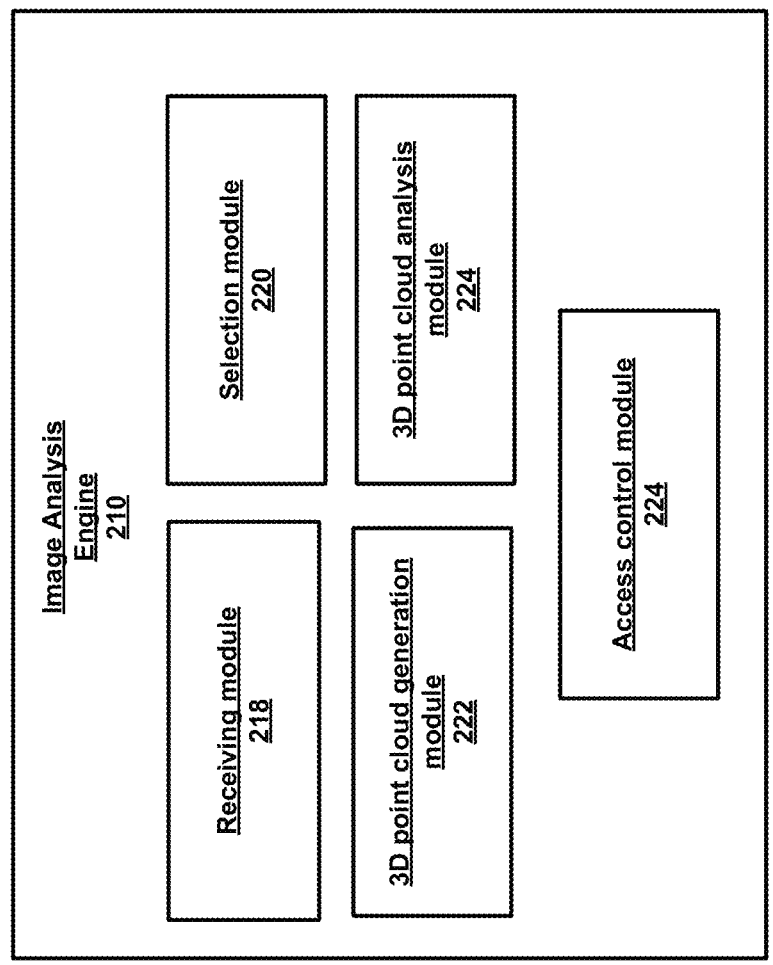
FIG. 2B is a block diagram of an example of an image analysis engine.

The image analysis engine 210 can be interchangeably referred to as an image analysis module, and can include multiple modules, for example, a receiving module 218 and a selection module 220, as shown in FIG. 2B. The receiving module 218 can include a wired or wireless transceiver, and be configured to receive a first image and a second image, wherein the first image represents a first relative location of the image acquisition device with respect to a subject, and the second image represents a second relative location, different from the first relative location, of the image acquisition device with respect to the subject. The selection module 220 can be programmed to select at least a pair of images that represent views of a subject from two separate vantage points, and the location of the camera at the corresponding locations are available.

In some implementations, the image analysis engine 210 includes a 3D point cloud generation module 222 that generates a 3D point cloud from identified subject and background points as described above. For example, the 3D point cloud generation module can label multiple corresponding points in a pair of images as either representing the subject or the background, and generate their corresponding locations in a 3D space, based on the known separation between the locations from which the two images were captured. The image analysis engine 210 can also include a 3D point cloud analysis module 224 that determines, for example, whether a difference between a representative depth of the background points and a representative depth of the subject points satisfy a threshold condition. The image analysis engine 210 can also include an access control module 224 that determines, based on input from the 3D point cloud analysis module as to whether or not the threshold condition is satisfied, and in response, prevents or grants access to a secure system, respectively. For example, if the difference satisfies the threshold condition, the access control module can identify the first subject as an alternative representation of a live person, and in response prevent access to the secure system. On the other hand, if the difference fails to satisfy the threshold condition, the access control module can identify the first subject as a live person, and in response initiate an authentication process for determining if the live person is authorized to access the secure system.

Referring again to FIG. 2A, in some implementations, the image analysis engine 210 can include (or communicate with) a biometric authentication system 212 that controls access to the secure system 215. For example, the image analysis engine can determine, based on the subject motion determined for a subject, that a subject in the images is an alternative representation of a live person. This can happen, for example, during a malicious attempt of unauthorized access to the secure system 215 in which the perpetrator of the attempt points the image acquisition device towards a high quality photograph of an authorized user that is printed on paper, or displayed on a high resolution display device. Responsive to determining that the subject is an alternative representation of a live person, the image analysis engine can preemptively prevent any of the images to be further processed by the biometric authentication system 212, thereby preventing access to a secure system 215. On the other hand, if the image analysis engine 210 determines that the subject of the images is a live person, an authentication process based on one or more images of the captured sequence can be initiated (e.g., at the biometric authentication system 212) to determine if the live person is authorized to access the secure system 215.

Figure 3A:
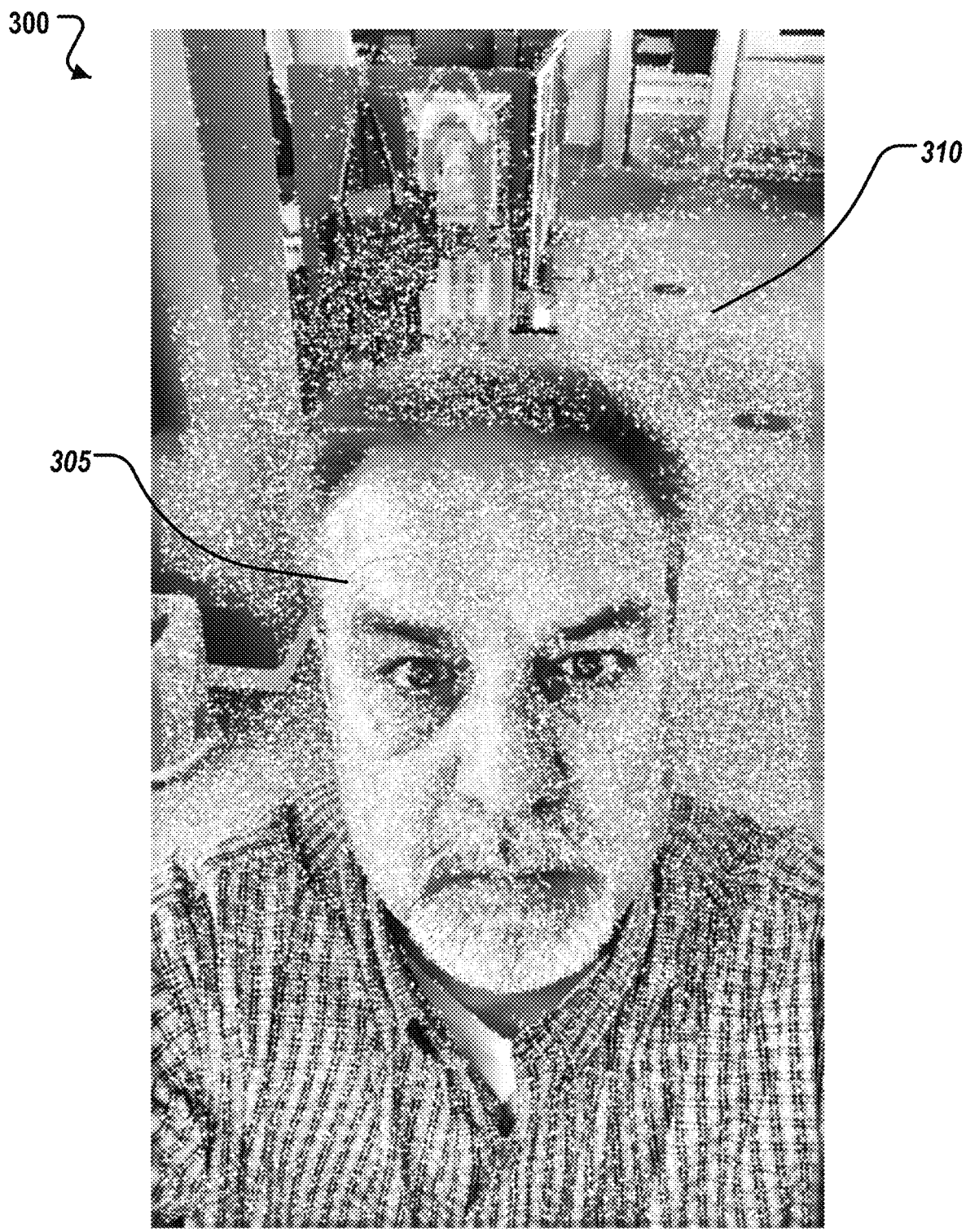
FIG. 3A is an image of a live human in which points corresponding to the subject and the background are identified.

FIGS. 3A-3F represent a couple of illustrative examples of the technology described herein. Specifically FIG. 3A is an image 300 of a live human in which points corresponding to the subject and the background are identified. The image 300 is one of a pair of images captured at two different locations of the camera. In some implementations, the image analysis engine 210 processes one of the two images to first identify points of interest in the image. This can correspond to, for example, identifying points that have strong contrast to adjacent points. Once the points of interest are identified in one image, the corresponding points are then identified in the second image, and a displacement of individual points between the two images is then calculated with respect to a reference point. The matching points are then classified as either points that represent the subject or points that represent the background. In the example of FIG. 3A, an example of a region (represented by a first set of points) is identified using the reference numeral 305, and an example of a background (represented by a second set of points) is identified using the reference numeral 310. The corresponding points in the second image of the image pair are then identified, and the depth of the points are then calculated using a 3D reconstruction process using the known difference in locations between the corresponding locations of the camera.

Figure 3B:
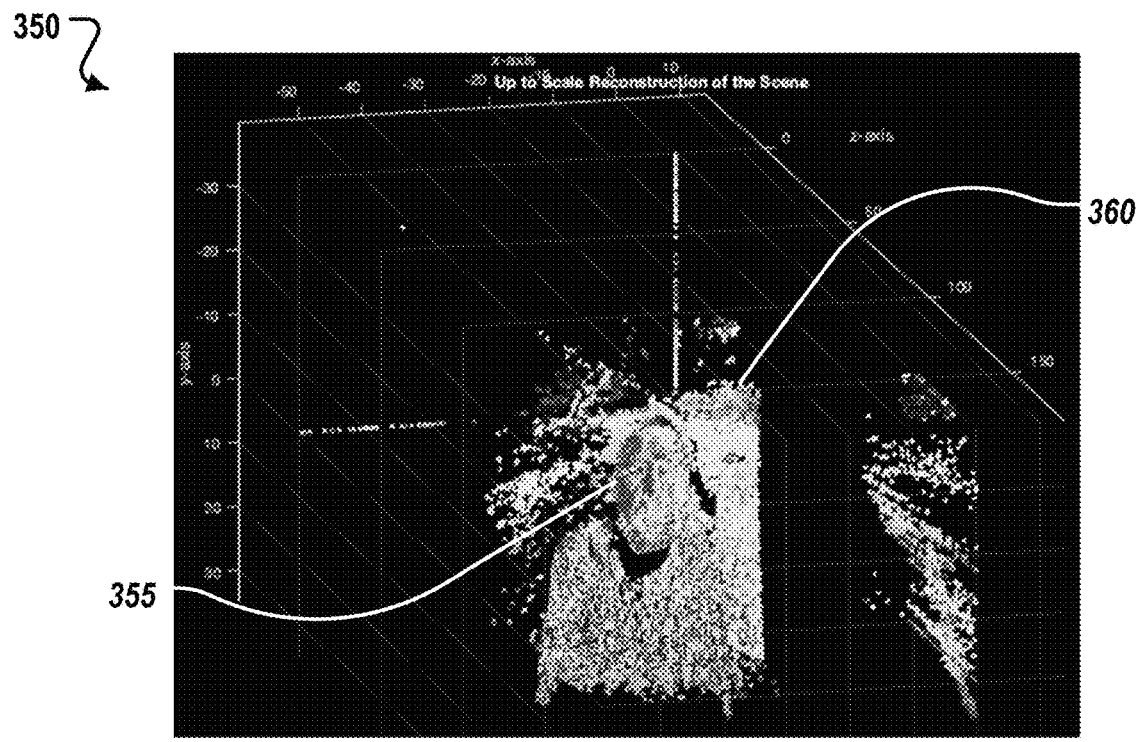
FIGS. 3B and 3C are illustrations of two separate views of the 3D point clouds generated based on the points shown as identified in FIG. 3A.
Figure 3C:
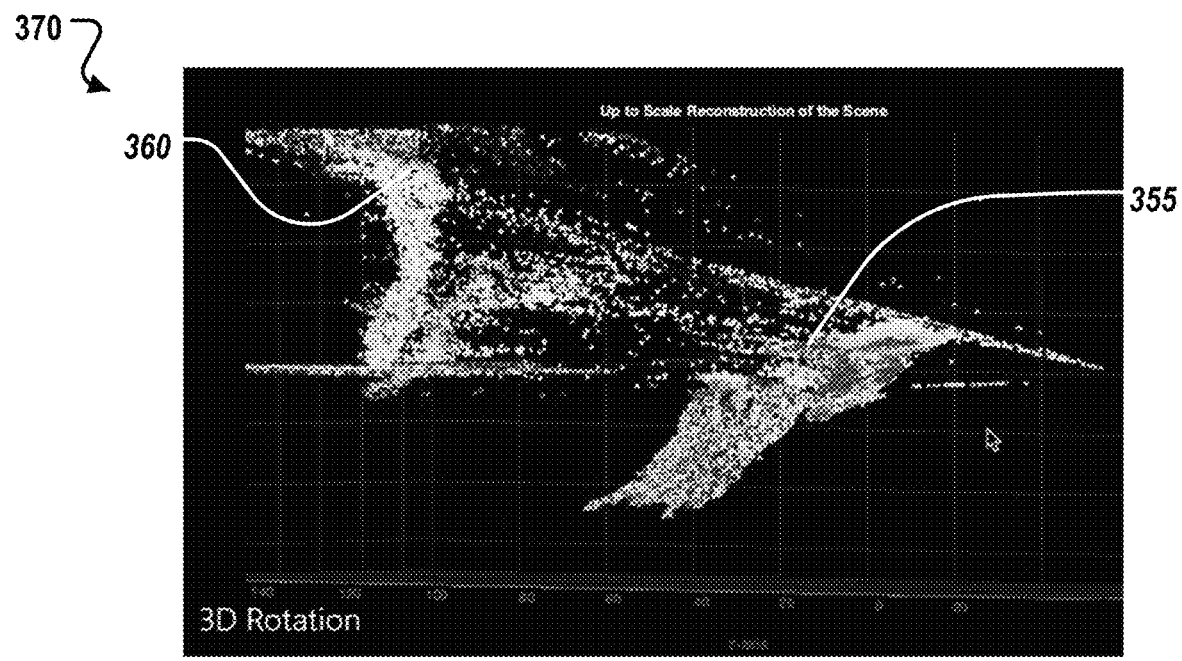

The 3D reconstruction process generates a 3D point cloud as shown in the image 350 in FIG. 3B. In this example, the region 355 shows a cluster of points from a first set (e.g., a set representing points depicting a subject), and the region 360 shows a cluster of points from a second set (e.g., a set representing points depicting background). If the depth of the points representing the subject is above a threshold distance from a depth of the background, the subject can be determined to be a true 3D shaped object, and hence identified as a live human being. This is shown in the example image 370 in FIG. 3C which represents a 3D rotation of the point cloud around a rotation axis that is substantially parallel to the y axis shown in FIG. 3B. In the image 370, the region 355 can be seen to be located at a different depth (or z value) as compared to the background region 360. If this difference in depth satisfies a threshold condition (e.g., a threshold distance that is determined empirically), the subject can be determined to be a live person, and an authentication process for allowing the person to attempt an access to a secure system can be initiated.

Figure 3D:
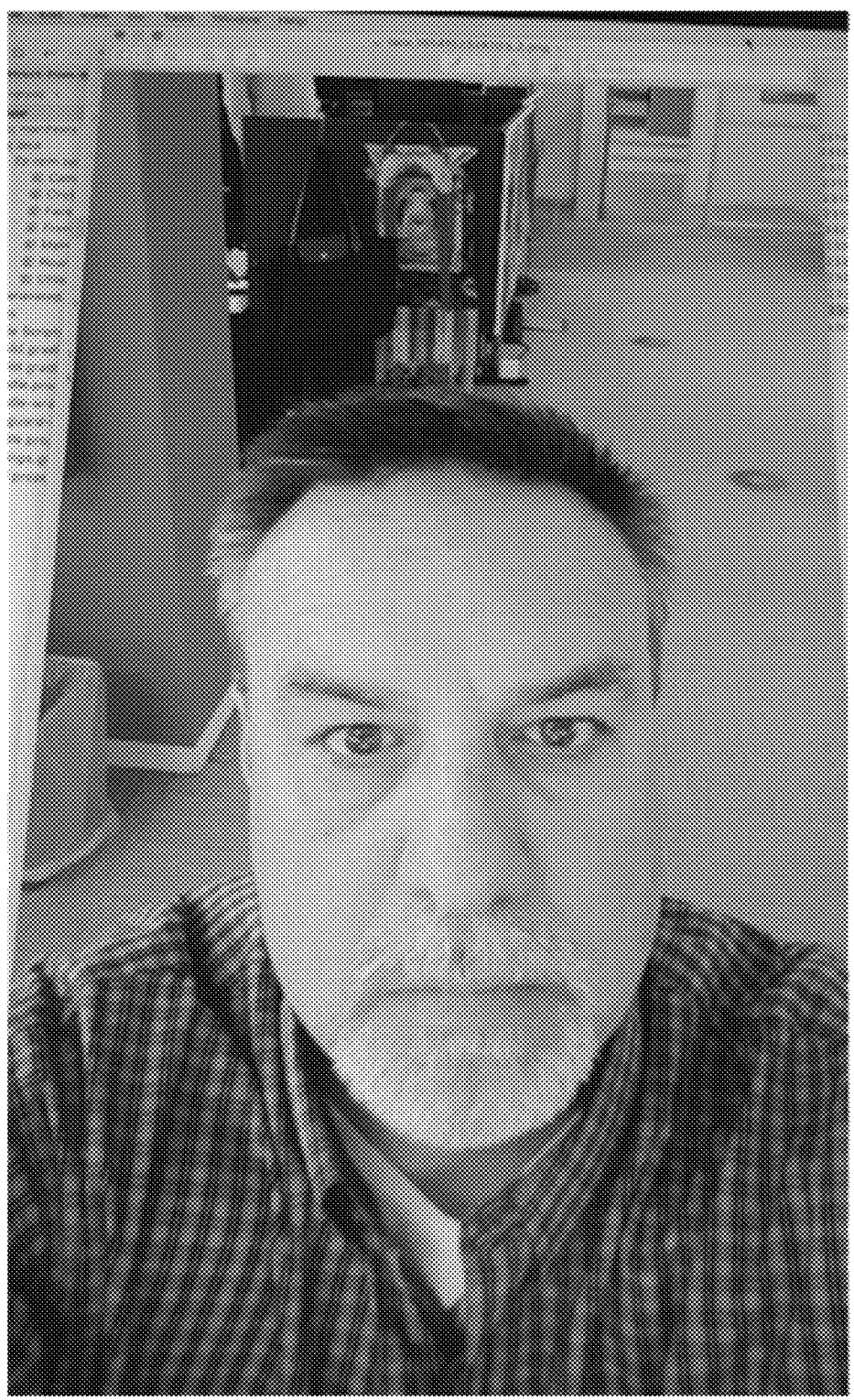
FIG. 3D is an image of a spoof alternative representation of a human, wherein the spoof representation is presented on a display device.
Figure 3E:
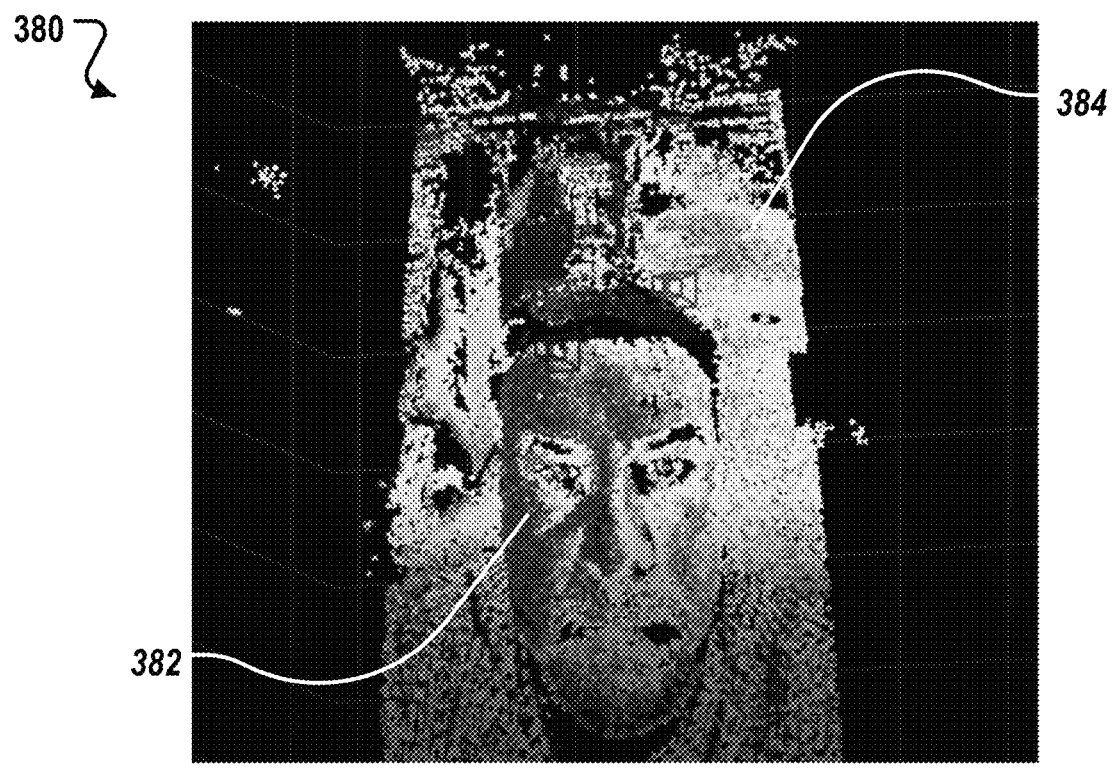
FIGS. 3E and 3F are illustrations of two separate views of the 3D point clouds generated from the spoof representation of FIG. 3D.
Figure 3F:
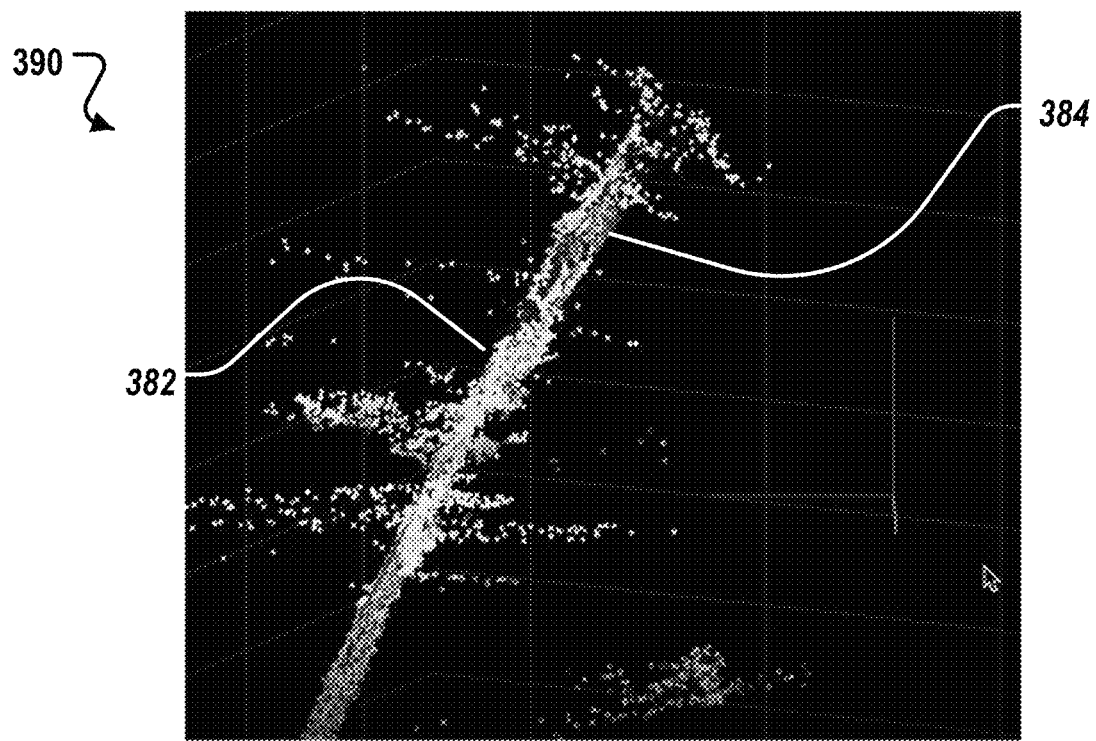

FIGS. 3D-3F illustrate an example where a spoof is detected using the technology described herein. Specifically, FIG. 3D shows a spoof alternative representation of a live human being, in which an image of the human being is presented on a high resolution display device. The corresponding 3D point cloud, as viewed from the front, is shown in the image 380 in FIG. 3E. In the example image 380, the region 382 represents the first set of points from a portion of the subject, and the region 384 represents the background. However, when the 3D visualization is rotated (FIG. 3F), and the distribution of the points along the depth axis (z-axis, in this example) is observed, both regions 382 and 384 are seen as being distributed substantially along a same plane. This can be determined, for example, by computing a difference between a representative depth of the background and a representative depth of the subject, and checking if the difference is less than the threshold distance. In some implementations, the difference being less than the threshold distance indicates that the underlying images are of a spoof alternative representation, and further processing using the images can be preempted accordingly.

In some implementations, the distribution of the subject points and the background points along the depth axis can be represented by a histogram, where each point is placed in a particular bin of the histogram based on its location along the depth axis. When both the subject and background points are clustered around a particular depth, the histogram has a high peak (or a few high peaks) clustered around a narrow range of depth values. Consequently, such a shape of the histogram can be indicative of the underlying images being spoofs. On the other hand, if the peaks of the histogram is spread over a relatively wide range of values, the shape of the histogram can be indicative of the underlying images being of an actual human being. This histogram-based approach can also be used in discriminating between live human beings and spoofs.

Figure 4:
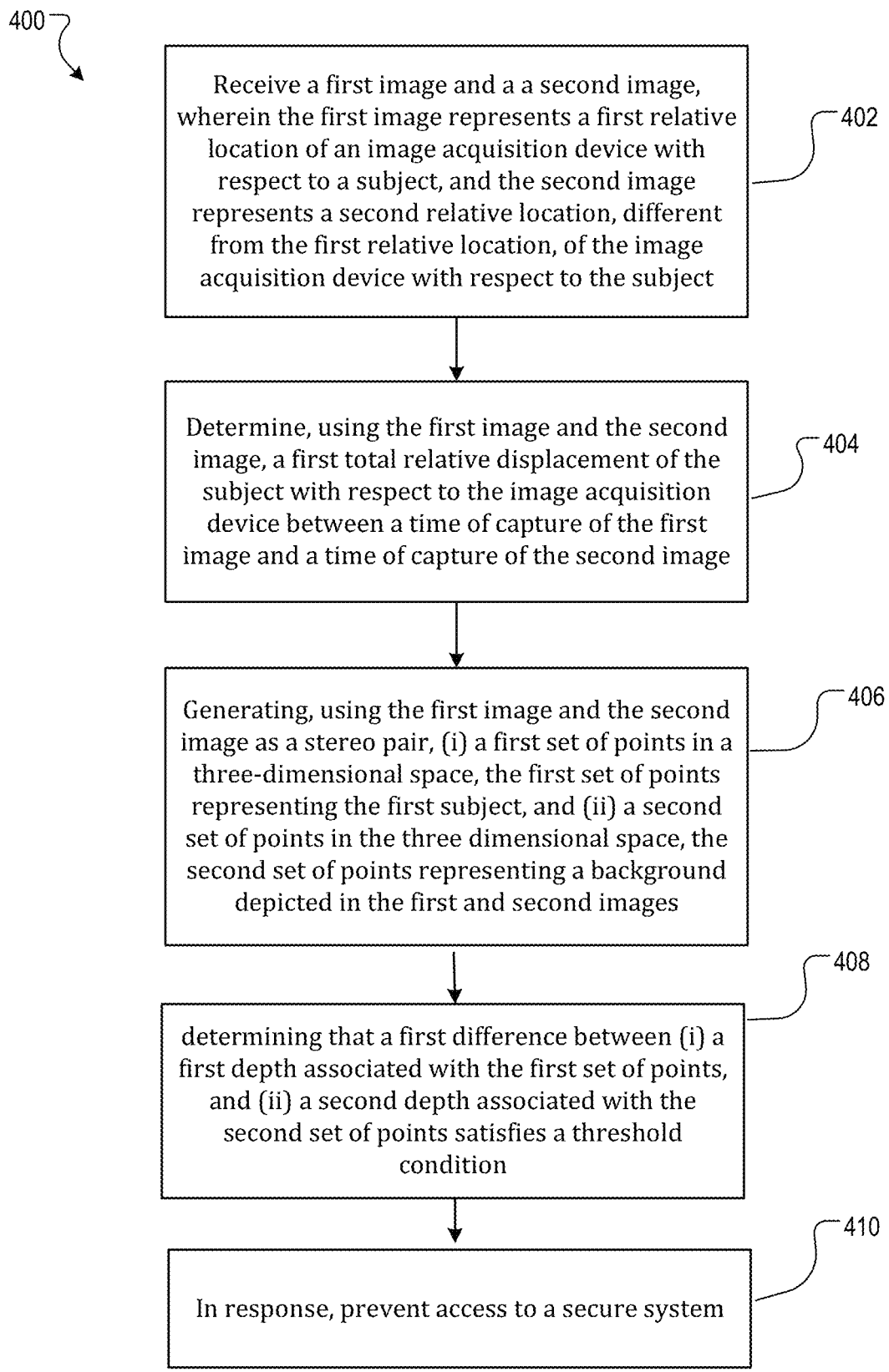
FIG. 4 is a flowchart of an example process for preventing access to a secure system in accordance with technology described herein.

FIG. 4 is a flowchart of an example process 400 for preventing access to a secure system in accordance with technology described herein. In some implementations, at least a portion of the operations of the process 400 can be performed by one or more processing devices of a special purpose computing device such as the image analysis engine 210 described with reference to FIG. 2. Operations of the process 400 includes receiving, at one or more processing devices, a first image and a second image (402). The first image represents a first relative location of an image acquisition device with respect to a subject, and the second image represents a second relative location, different from the first relative location, of the image acquisition device with respect to the first subject. For example, the first image and the second image can be captured from two different locations as a user lifts the image acquisition device (e.g., a camera disposed in a mobile device) towards the subject. The first and second images can be a part of a sequence of images that are captured as the mobile device is moved towards the subject.

Operations of the process 400 also includes determining, using the first image and the second image, a total relative displacement of the first subject with respect to the image acquisition device between a time of capture of the first image and a time of capture of the second image (404). In some implementations, this can be done as described above with reference to the example of FIGS. 3A and 3B. For example, determining the total relative displacement can include identifying multiple points of interest in the first image, identifying, in the second image, points corresponding to each of the multiple points of interest, and determining displacement of the multiple points of interest from the first image to the second image with respect to a reference point. The total relative displacement of the subject can then be determined based on the displacement of the multiple points of interest using (i) an estimated distance between the image acquisition device and the camera, and (ii) one or more camera parameters. In some a fundamental matrix indicative of a difference between the orientations of the image acquisition device at the times of capture of the first image and second image, respectively, may be determined in the process of determining the total relative displacement.

Operations of the process 400 also includes generating, using the first image and the second image as a stereo pair, (i) a first set of points in a three-dimensional space, the first set of points representing the first subject, and (ii) a second set of points in the three dimensional space, the second set of points representing a background depicted in the first and second images (406). This can be done, for example, using a photometric stereo process for estimating a three dimensional shape from two dimensional images. The photometric stereo process can include, for example, a a structure-from-motion process, or a shape-from-shading process. The operations of the process 400 further include determining that a first difference between (i) a first depth associated with the first set of points, and (ii) a second depth associated with the second set of points satisfies a threshold condition (408). For example, if the first difference is less than a threshold, the threshold condition can be deemed to be satisfied, and the subject can be determined to be an inanimate object such as a printed photograph or image displayed on a screen, and hence flagged as a likely spoof.

Operations of the process 400 further includes preventing, responsive to determining that the first subject is an alternative representation of a live person, access to a secure system (410). This can preemptively reduce additional operations that may be needed in authenticating a subject to a secure system. On the other hand, if a determination is made that the subject is a live person, an authentication process can be initiated to determine if the live person is authorized to access the secure system.

Figure 5:
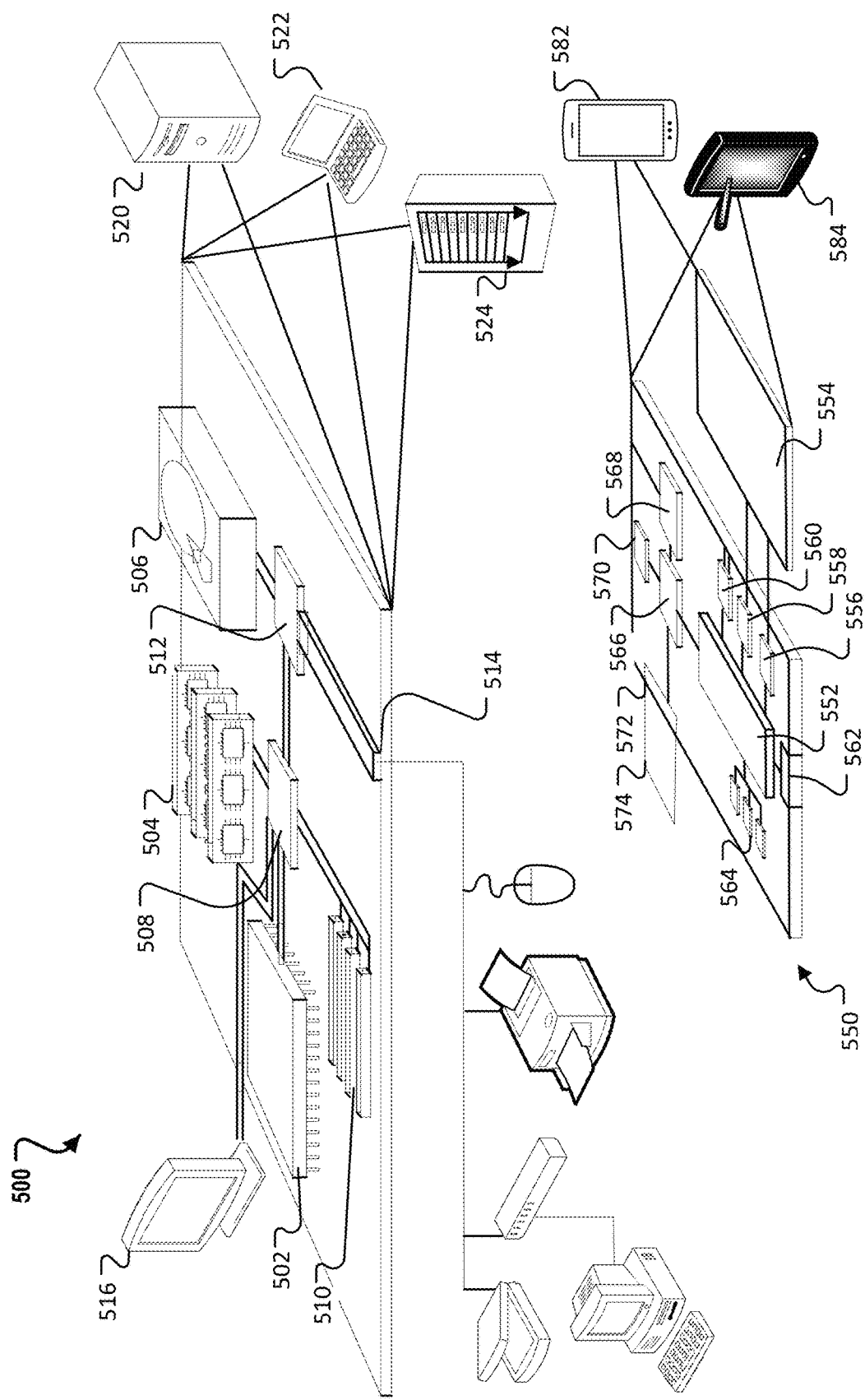
FIG. 5 is a block diagram representing examples of computing devices.

FIG. 5 shows an example of a computing device 500 and a mobile device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is an example only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, and so forth) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, tablet computer 584, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification the term "engine" is used broadly to refer to a software-based system, subsystem that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Although a few implementations have been described in detail above, other modifications may be made without departing from the scope of the inventive concepts described herein, and, accordingly, other implementations are within the scope of the following claims.

What is claimed is:

1. A method comprising:
    receiving, at one or more processing devices, a first sequence of two-dimensional multiple images of a first subject captured from multiple viewpoints, taken by a single image acquisition device over a time period in which relative locations of the single image acquisition device with respect to the first subject vary;
    selecting, by the one or more processing devices, a first image and a second image from the first sequence of two-dimensional images, wherein the first image represents a first relative location of the single image acquisition device with respect to the first subject and serves as a reference, and the second image represents a second relative location, different from the first relative location, of the single image acquisition device with respect to the first subject;
    generating, by the one or more processing devices, by using the first image and the second image as a stereo pair in a three-dimensional reconstruction process, (i) a first set of points in a three-dimensional space serving as a 3D point cloud, the first set of points representing the first subject, and (ii) a second set of points in the three-dimensional space serving as the 3D point cloud, the second set of points representing a background depicted in the first image and the second image;

determining that a first difference between (i) a first depth associated with the first set of points in the three-dimensional space, and (ii) a second depth associated with the second set of points in the three-dimensional space satisfies a threshold condition, wherein the threshold condition determines if the subject in the first image and the background are within a threshold distance of one another and this information is used to determine if the subject is a spoof alternative representation, wherein the spoof alternative representation is detectable as a 3D of a subject generated from two images reveals that that the first set of points corresponding to the subject and the second set of points corresponding to the background are at substantially a same depth in the 3D point cloud;

responsive to determining that the first difference in depth satisfies the threshold condition, determining by an inference that the subject is not a live person, and preventing access to a secure system; and determining that the subject is a live person by using the first image as a reference and calculating movement evident between the first image and the second image by detecting match points in each of the first image and the second image, by labeling the match points as being at least one of a part of the subject and the background, and generating the 3D point cloud by determining a location of the match points in a 3D space.

2. The method of claim 1, further comprising:
identifying the first subject as an alternative representation of a live person responsive to determining that the first difference satisfies a threshold condition; and
preventing the access to the secure system responsive to identifying the first subject as an alternative representation of a live person.

3. The method of claim 1, wherein the single image acquisition device is at least one of a camera and a video disposed on a mobile device, and the first sequence of two-dimensional multiple images are captured as the mobile device is moved towards the first subject and wherein the single image acquisition device includes one or more position sensors usable to estimate a location of the image acquisition device.

4. The method of claim 2, wherein the alternative representation of the live person comprises a photograph of the live person printed on paper, or presented on a display device.

5. The method of claim 1, wherein the three-dimensional reconstruction process comprises a photometric stereo process, and
wherein at least one of the first set of points and the second set of points is generated using the photometric stereo process for estimating a three-dimensional shape from two dimensional images, wherein the photometric stereo process includes at least one of a structure-from-motion process and shape-from-shading process.

6. The method of claim 5, wherein the photometric stereo process comprises a structure-from-motion process.

7. The method of claim 5, wherein the photometric stereo process comprises a shape-from-shading process.

8. The method of claim 1, further comprising:
receiving, at the one or more processing devices, a second sequence of two-dimensional images of a second subject captured from multiple viewpoints by the single image acquisition device over a time period in which relative locations of the single image acquisition device with respect to the second subject vary;
selecting, by the one or more processing devices, a third image and a fourth image from the second sequence of two-dimensional images, wherein the third image represents a third relative location of the single image acquisition device with respect to the second subject, and the fourth image represents a fourth relative location, different from the third relative location, of the single image acquisition device with respect to the second subject;
generating, by the one or more processing devices and using the third image and the fourth image as another stereo pair in the three-dimensional reconstruction process, (i) a third set of points in the three-dimensional space, the third set of points representing the second subject, and (ii) a fourth set of points in the three-dimensional space, the fourth set of points representing a background depicted in the third image and the fourth image;
determining that a second difference between (i) a third depth associated with the third set of points in the three-dimensional space, and (ii) a fourth depth associated with the fourth set of points in the three-dimensional space fails to satisfy the threshold condition; and
responsive to determining that the second difference fails to satisfy the threshold condition, initiating an authentication process for determining if the second subject is authorized to access the secure system.

9. A system comprising:
a single image acquisition device, wherein the single image acquisition device is at least one of a camera and a video disposed on a mobile device and the single image acquisition device includes one or more position sensors usable to estimate a location of the single image acquisition device, configured to capture a first sequence of two-dimensional images of a first subject from multiple viewpoints over a time period in which relative locations of the single image acquisition device with respect to the first subject vary; and
an image analysis engine comprising one or more processing devices, wherein the image analysis engine is configured to:
receive the first sequence of two-dimensional images,
select a first image and a second image from the first sequence of two-dimensional images, wherein the first image represents a first relative location of the single image acquisition device with respect to the first subject and serves as a reference, and the second image represents a second relative location, different from the first relative location, of the single image acquisition device with respect to the first subject,
generate, using the first image and the second image as a stereo pair in a three-dimensional reconstruction process, (i) a first set of points in a three-dimensional space serving as a 3D point cloud, the first set of points representing the first subject, and (ii) a second set of points in the three-dimensional space serving as the 3D point cloud, the second set of points representing a background depicted in the first image and the second image,
determine that a first difference between (i) a first depth associated with the first set of points in the three-dimensional space, and (ii) a second depth associated with the second set of points in the three-dimensional space satisfies a threshold condition, wherein the threshold condition determines if the subject in the first image and the background are within a threshold distance of one another and this information is used to determine if the subject is a spoof alternative representation, wherein the spoof alternative representation is detectable as a 3D of a subject generated from two images reveals that that the first set of points corresponding to the subject and the second set of points corresponding to the background are at substantially a same depth in the 3D point cloud;

responsive to determining that the first difference in depth satisfies the threshold condition, determining by an inference that the subject is not a live person to prevent access to a secure system determining that the subject is a live person by using the first image as a reference and calculating movement evident between the first image and the second image by detecting match points in each of the first image and the second image, by labeling the match points as being at least one of a part of the subject and the background, and generating the 3D point cloud by determining a location of the match points in a 3D space.

10. The system of claim 9, wherein the image analysis engine is configured to:
identify the first subject as an alternative representation of a live person responsive to determining that the first difference satisfies a threshold condition; and
prevent the access to the secure system responsive to identifying the first subject as an alternative representation of a live person.

11. The system of claim 9, wherein the single image acquisition device comprises a camera disposed on a mobile device, and the first sequence of two-dimensional images from multiple viewpoints are captured as the mobile device is moved towards the first subject.

12. The system of claim 10, wherein the alternative representation of the live person comprises a photograph of the live person printed on paper, or presented on a display device.

13. The system of claim 9, wherein the three-dimensional reconstruction process comprises a photometric stereo process, and wherein the image analysis engine is configured to generate the first set of points and the second set of points using the photometric stereo process for estimating a three-dimensional shape from two-dimensional images.

14. The system of claim 13, wherein the photometric stereo process comprises a structure-from-motion process.

15. The system of claim 13, wherein the photometric stereo process comprises a shape-from-shading process.

16. The system of claim 9, wherein the image analysis engine is configured to:
receive a second sequence of two-dimensional images of a second subject captured from multiple viewpoints by the single image acquisition device over a time period in which relative locations of the single image acquisition device with respect to the second subject vary;
select a third image and a fourth image from the second sequence of two-dimensional images, wherein the third image represents a third relative location of the single image acquisition device with respect to the second subject, and the fourth image represents a fourth relative location, different from the third relative location, of the single image acquisition device with respect to the second subject;
generate, using the third image and the fourth image as another stereo pair in a three-dimensional reconstruction process, (i) a third set of points in the three-dimensional space serving as a 3D point cloud, the third set of points representing the second subject, and (ii) a fourth set of points in the three-dimensional space serving as a 3D point cloud, the fourth set of points representing a background depicted in the third image and the fourth image;
determine that a second difference between (i) a third depth associated with the third set of points in the three-dimensional space, and (ii) a fourth depth associated with the fourth set of points in the three-dimensional space fails to satisfy the threshold condition;
responsive to determining that the second difference fails to satisfy the threshold condition, initiate an authentication process for determining if the second subject is authorized to access the secure system.

17. One or more non-transitory machine-readable storage devices having encoded thereon computer readable instructions for causing one or more processing devices to perform operations comprising:
receiving a first sequence of two-dimensional images of a first subject captured from multiple viewpoints by a single image acquisition device, wherein the single image acquisition device is at least one of a camera and a video disposed on a mobile device and the single image acquisition device includes one or more position sensors usable to estimate a location of the single image acquisition device, over a time period in which relative locations of the single image acquisition device with respect to the first subject vary;
selecting a first image and a second image from the first sequence of two-dimensional images, wherein the first image represents a first relative location of the single image acquisition device with respect to the first subject and serves as a reference, and the second image represents a second relative location, different from the first relative location, of the single image acquisition device with respect to the first subject;
generating, using the first image and the second image as a stereo pair in a three-dimensional reconstruction process, (i) a first set of points in a three-dimensional space, the first set of points representing the first subject, and (ii) a second set of points in the three-dimensional space, the second set of points representing a background depicted in the first image and the second image;
determining that a first difference between (i) a first depth associated with the first set of points in the three-dimensional space, and (ii) a second depth associated with the second set of points in the three-dimensional space satisfies a threshold condition; wherein a spoof alternative representation is detectable as a 3D of a subject generated from two images revealing that that the first set of points corresponding to the subject and the second set of points corresponding to the background are at substantially a same depth in the 3D point cloud;
responsive to determining that the first difference in depth satisfies the threshold condition, determining by inference that the subject is not a live person, preventing access to a secure system; and determining that the subject is a live person by using the first image as a reference and calculating movement evident between the first image and the second image by detecting match points in each of the first image and the second image, by labeling the match points as being at least one of a part of the subject and the background, and generating a 3D point cloud by determining a location of the match points in a 3D space.

18. The one or more non-transitory machine-readable storage devices of claim 17, wherein the single image acquisition device is a camera disposed on a mobile device, and the sequence of two-dimensional images are captured as the mobile device is moved towards the first subject.

19. The one or more non-transitory machine-readable storage devices of claim 17, wherein the three-dimensional reconstruction process comprises a photometric stereo process, and wherein at least one of the first set of points and the second set of points is generated using the photometric stereo process for estimating a three-dimensional shape from two-dimensional images.

20. The one or more non-transitory machine-readable storage devices of claim 17, the operations comprising:
receiving a second sequence of two-dimensional images from multiple viewpoints of a second subject captured by the single image acquisition device over a time period in which relative locations of the single image acquisition device with respect to the second subject vary;
selecting a third image and a fourth image from the second sequence of two-dimensional images, wherein the third image represents a third relative location of the single image acquisition device with respect to the second subject, and the fourth image represents a fourth relative location, different from the third relative location, of the single image acquisition device with respect to the second subject;
generating, using the third image and the fourth image as another stereo pair in the three-dimensional reconstruction process, (i) a third set of points in the three-dimensional space, the third set of points representing the second subject, and (ii) a fourth set of points in the three-dimensional space, the fourth set of points representing a background depicted in the third image and the fourth image;
determining that a second difference between (i) a third depth associated with the third set of points in the three-dimensional space, and (ii) a fourth depth associated with the fourth set of points in the three-dimensional space fails to satisfy the threshold condition; and
responsive to determining that the second difference fails to satisfy the threshold condition, initiating an authentication process for determining if the second subject is authorized to access the secure system.

* * * * *